United States Patent [19]

Matsumoto

[11] Patent Number: 4,723,172

[45] Date of Patent: Feb. 2, 1988

[54] FACSIMILE APPARATUS

[75] Inventor: Kouichi Matsumoto, Tokyo, Japan

[73] Assignee: Canon Kabushiki Kaisha, Tokyo, Japan

[21] Appl. No.: 849,876

[22] Filed: Apr. 9, 1986

[30] Foreign Application Priority Data

Apr. 25, 1985 [JP] Japan ................................ 60-87405

[51] Int. Cl.⁴ .............................................. H04N 1/00
[52] U.S. Cl. .................................... 358/256; 358/280; 358/293
[58] Field of Search ................ 358/256, 293, 257, 280

[56] References Cited

U.S. PATENT DOCUMENTS

| 4,113,993 | 9/1978 | Heckman et al. | 358/257 |
| 4,142,214 | 2/1979 | Yamazaki et al. | 358/257 |
| 4,424,535 | 1/1984 | Rothbart et al. | 358/293 |
| 4,622,594 | 11/1986 | Homjo et al. | 358/293 |
| 4,631,596 | 12/1986 | Yaguchi | 358/256 |

Primary Examiner—Edward L. Coles, Sr.
Attorney, Agent, or Firm—Fitzpatrick, Cella, Harper & Scinto

[57] ABSTRACT

A facsimile apparatus comprises a reading device for reading information from an original sheet, a transmission device for transmitting picture information, and a detecting device for detecting the presence of the original sheet at a predetermined position. A memory is provided for storing predetermined picture information representing pagination between successive original sheets. The operation of the facsimile apparatus is controlled by a control device which is adapted to cause the transmission device to transmit the picture information stored in the memory when the trailing end of a preceding original sheet or a leading end of a succeeding original sheet is detected by the detecting device during reading and transmission of information from a plurality of successive original sheets, while allowing transmission of information carried by a plurality of successive separate original sheets as a batch of information carried by a single continuous sheet.

31 Claims, 6 Drawing Figures

FACSIMILE APPARATUS

BACKGROUND OF THE INVENTION

1. Field of the Invention

The present invention relates to a facsimile apparatus which is adapted to successively read information on a plurality of original sheets and to send it to a distant station.

2. Description of the Prior Art

Known facsimile apparatus are broadly sorted into two types: namely, a first type which handles separate cut sheets and a second type which employs a continuous rolled sheet. In a facsimile of the second type, the picture information transmitted from a distal station is recorded in a continuous rolled sheet having a breadth corresponding to a standard paper size such as A-4 size. Current facsimile apparatus incorporates a sheet cutting mechanism which automatically cuts the continuous sheet into separate sheets of a standard size. Such a cutting mechanism, however, raises the cost of the facsimile apparatus.

Therefore, some facsimile apparatus, particularly facsimile apparatus of popular types, are not equipped with a sheet cutting mechanism. In such facsimile apparatus, the received picture information is continuously recorded and outputted on the continuous sheet. This often causes confusion as to the demarcation between the information carried by a preceding original sheet and the information carried by a succeeding original sheet, because there is no means on the continuous sheet after the recording which would enable the reader to discriminate them. In consequence, the users encountered difficulty in cutting the continuous sheet at correct positions for the purpose of filing or copying. In fact, there is a risk that the continuous sheet may be cut at the wrong position, particularly when the original sheets have irregular sizes.

SUMMARY OF THE INVENTION

Accordingly, it is a primary object of the invention to provide an improved facsimile apparatus.

Another object of the invention is to overcome the above-described problems of the known facsimile apparatus.

Still another object of the invention is to provide a facsimile apparatus which permits easy recognition of the boundary on the continuous sheet after recording between the groups of information carried by successive pages of the original.

A further object of the invention is to provide a facsimile apparatus which is capable of shortening the communication time.

To these ends, according to the invention, there is provided a facsimile apparatus comprising: a reading means for reading information from an original sheet; a transmission means for transmitting picture information; a detecting means for detecting the presence of the original sheet at a predetermined position; a memory means storing a predetermined picture information representing pagination between successive original sheets; and a control means adapted to cause the transmission means to transmit the picture information stored in the memory means when the trailing end of a preceding original sheet or a leading end of a succeeding original sheet is detected by the detecting means during reading and transmission of information from a plurality of successive original sheets, while transmitting a group of information carried by a plurality of successive separate original sheet as a batch of information carried by a single continuous sheet.

The above and other objects, features and advantages of the invention will become clear from the following description of the preferred embodiments when the same is read in conjunction with the accompanying drawings.

DESCRIPTION OF THE PREFERRED EMBODIMENTS

Figure 1:
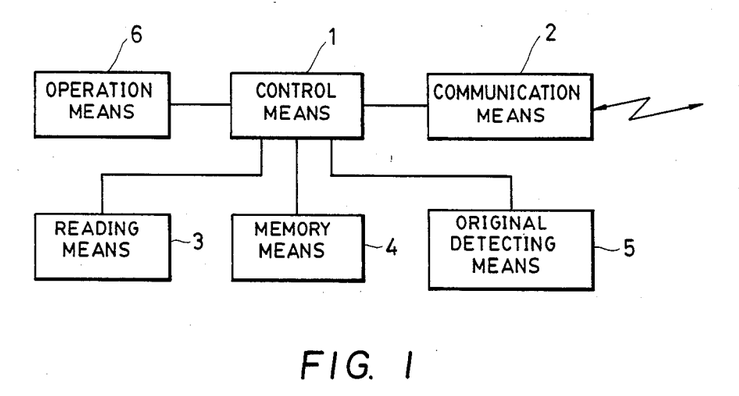
FIG. 1 is a block diagram of an embodiment of the facsimile apparatus in accordance with the invention.

Referring to FIG. 1, which is a block diagram of a basic arrangement of the facsimile apparatus of the invention, a reference numeral 1 generally designates a control means which is composed of a microcomputer and peripheral devices such as an input port and an output port. This control means 1 is adapted to control the operation of the whole of a facsimile apparatus, including reading of originals, recording of picture signals and transmission and receiving of picture signals. A communication means 2 is adapted to conduct encoding and modulation of the picture signal, and to transmit the signal through a communication line. The communication means 2 is also adapted to conduct demodulation and decoding of the picture signal received through the communication line. The communication means 2 is composed of an encoder for encoding the picture signal, a decoder for decoding the picture signal, a modulator/demodulator for modulating and demodulating the picture signal, and so forth.

A reading means 3 for reading the information on an original sheet is constituted by various devices such as a CCD line sensor, and mechanisms such as a motor and rollers for conveying the original sheet.

A memory means 4 is adapted to store the control program of the control means 1 and other data. The memory means 4 is composed of memories such as Read Only Memories (referred to as "ROM", hereinafter), Random Access Memories (referred to as "RAM", hereinafter), and so forth.

A reference numeral 5 denotes an original detecting means for detecting the original sheet. The original detecting means 5 includes, for example, a photo-interrupter which is disposed along the path of the original sheet in the reading means 3.

Finally, a reference numeral 6 denotes an operation means. The operation means 6 includes key-input switches and similar input means which are adapted to be manipulated by the operator in the operation of the facsimile apparatus.

In the operation of this embodiment of the facsimile apparatus, the information carried by an original sheet is read by the reading means 3, and is transmitted by the communication means 2 to a similar facsimile apparatus of a distal station, through the communication line. During the transmission, the original detecting means 5 recognizes the leading end and the trailing end of each of the successive original sheets, and picture information is transmitted to the distal station so as to enable the facsimile operator of the distal station to recognize the boundary between the information from the preceding original sheet and that from the succeeding original sheet. This picture information may be, for example, a broken line, and is stored beforehand in the memory means 4, and is transmitted through the communication means 2 to the facsimile apparatus of the distal station, each time the interval between successive original sheets is detected. During this interval, the known facsimile communication process is not executed, after which the transmission is commenced again to send the information from the next original sheet. Thus, the information is transmitted by a process in which the apparatus regards and handles successive original sheets as though they were a single, continuous sheet.

Figure 2:
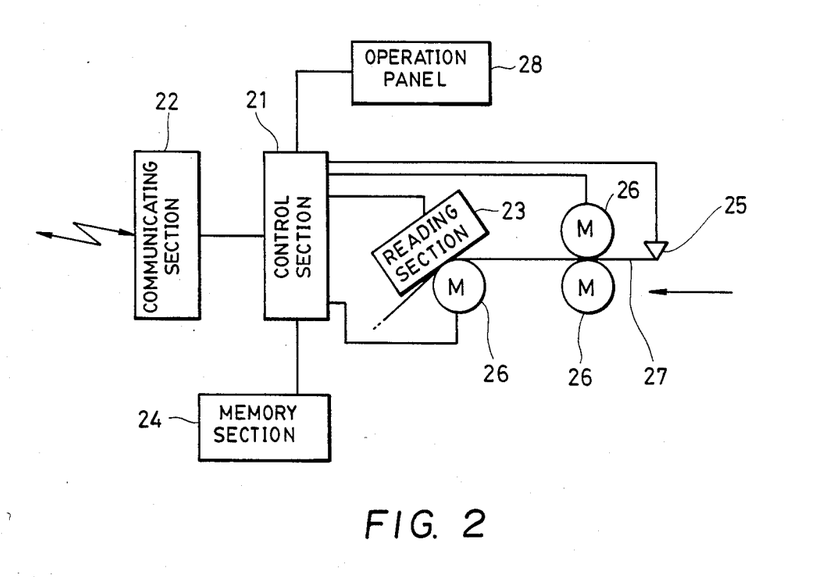
FIG. 2 is a detailed block diagram of the embodiment shown in FIG. 1.

FIG. 2 shows a detail of the arrangement shown in FIG. 1. A control section 21 is composed of, for example, a microcomputer. The control section 21, through control ports and driver elements which are known per se, controls the reading operation conducted by a reading section 23 composed of a CCD line sensor and so forth, as well as the conveyance of the original sheet 27. The original sheet 27 is conveyed into the facsimile apparatus from the right side as viewed in FIG. 2, by means of conveyor rollers 26, and the information carried by the original sheet 27 is read in a line-by-line fashion by the reading section 23. An original sheet detector 25 is disposed at the sheet inlet side of the path of the original sheet. The original sheet detector 25 is preferably constituted by a photo-interrupter, limit switch or a reflection-type photosensor, and is adapted to detect the presence or absence of an original sheet at the position of the detector 25.

A memory section 24 is connected to the control section 21. This memory section 24 preferably includes ROMs and RAMs which are adapted to store the control program, picture data and other data. The control section 21 operates to store in the memory section 24 the picture data read by the reading section 23 and to cause the communicating section 22 to transmit this data in accordance with a process which will be explained later.

The operator operates this facsimile apparatus through an operation panel 28 which has key-input switches, a display, and so forth.

The process of the operation of the facsimile apparatus is as follows.

As is well known, confirmation of the respective types or functions of the sending and receiving facsimile apparatus is conducted before the start of data communication, by means of a protocol such as, for example, the non-standard device signal NSC or NSS as in the case of G-III type apparatus, and the control of the communication is conducted on the basis of the thus confirmed function.

When the facsimile apparatus of the distal station, i.e., the receiving facsimile apparatus, employs a rolled sheet and does not have any automatic sheet cutting mechanism, the facsimile apparatus of the invention performs the following control. In this embodiment, when the information to be sent is carried by a plurality of original sheets, the information is regarded and treated in the same manner as if it were carried by a single, continuous original sheet, and the transmission of the information is conducted without using a pagination control signal, e.g., EOP, EOM, MPS, of the protocol.

Figure 3:
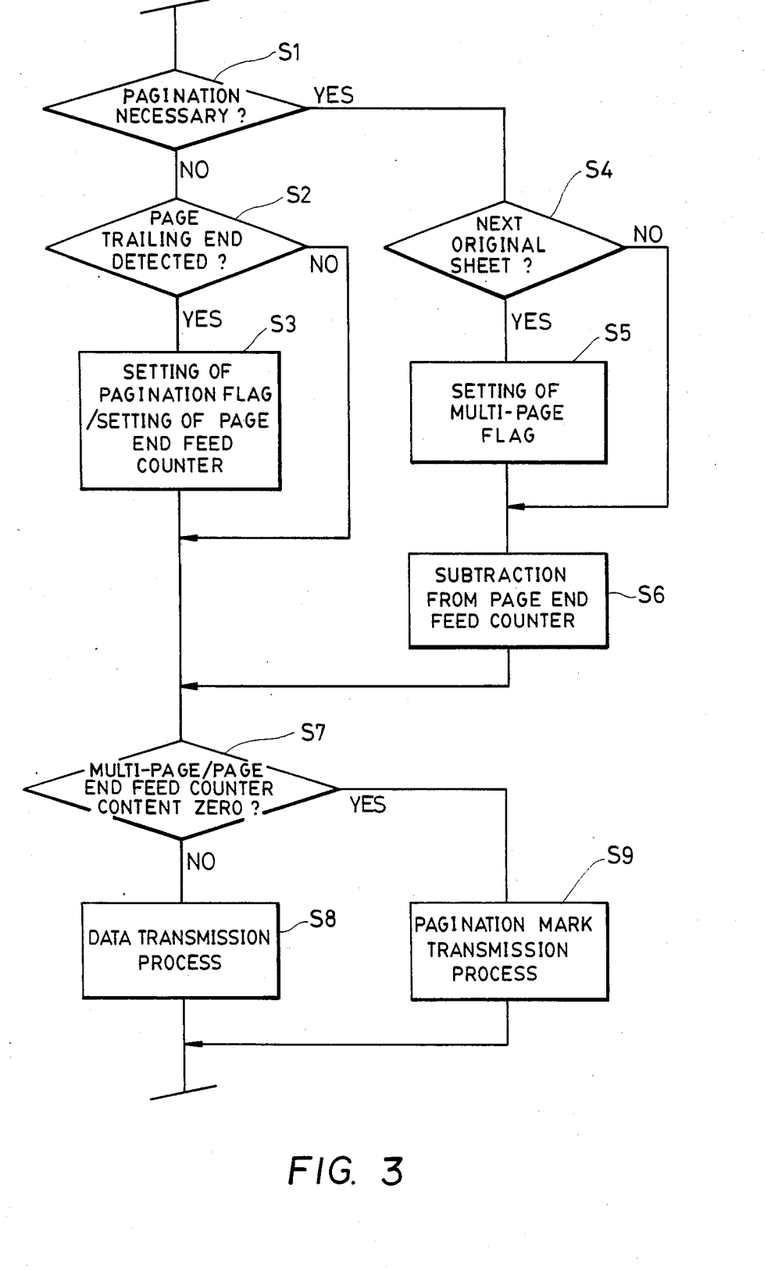
FIG. 3 is a flow chart showing the process of control performed by a control section which is shown in FIG. 2.

FIG. 3 is a flow chart showing the process executed by the control section 21 shown in FIG. 2.

As the reading of the information on the original sheet 27 is commenced, the control section executes a judgement in Step S1 as to whether pagination processing is necessary. This judgement is conducted through reading the state of a flag which will be described later. During the reading of the information on the first original sheet, the process proceeds to Step S2, in which a judgement is made as to whether the trailing end of the original sheet which is now being read has been detected by the original detector 25. When the trailing end has not been detected, the process proceeds directly to Step S7, whereas, when the same has been detected, the process proceeds to Step S7 via Step S3. In Step S3, the control section 21 sets the flag which in Step S1 is used to indicate whether the pagination process is to be conducted, and sets a predetermined value in a page end feed counter which is provided in a predetermined area of the memory section 24. This value corresponds to the amount of operation of the conveyor roller 26 required for conveying the original sheet from the position of the original sheet detector 25 to the position of the reading section 23.

Figure 4:
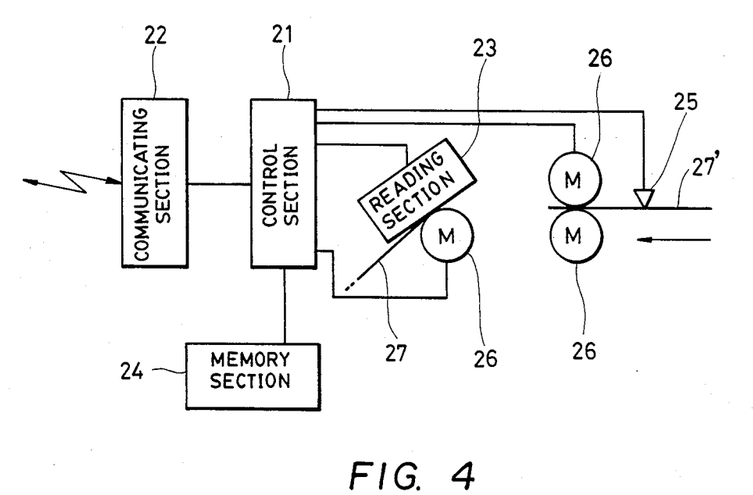
FIG. 4 is a schematic illustration of the operation of the embodiment.

In Step S7, the control section 21 examines the state of a later-described multi-page flag and the content of the page end feed counter mentioned above. An answer YES, i.e., the fact that the multi-page flag has been set and that the content of the page end feed counter is zero, means that there are a plurality of original sheets and that the interval between two successive sheets has been brought to the position of the reading section. However, when the answer is NO, the process proceeds to Step S8, in which the data of one line read by the reading section is transmitted in a manner known per se. Then, after completion of the transmission, the process returns to Step S1, and the operation described hereinbefore is repeated. On the other hand, when the setting of the flag executed in Step S3 is confirmed in Step S1, the process proceeds to Step S4, in order to conduct the pagination operation. In this Step S4, the state of the original sheet detector is examined to judge whether an additional original 27' has been fed in a manner shown in FIG. 4. If there is no such succeeding sheet, the process proceeds to Step S6 directly. However, when the presence of a succeeding sheet is confirmed, the process proceeds to Step S6 through Step S5, in which the control section sets the multi-page flag indicative of the presence of a plurality of original sheets.

In Step S6, a subtraction or decrement is effected from the content of the page end feed counter, each time a predetermined amount of operation is performed by the motor for driving the conveyor roller 26. The process then proceeds to Step S7.

In Step S7, the control section performs the examination explained before. Upon confirmation of the arrival of the trailing end of the original sheet at the reading section through recognition of the setting of the multi-plage flag, as well as the zero content of the page end feed counter, the process proceeds to Step S9, in which the control section operates to transmit a pagination mark. The pagination mark may be a graphic pattern such as a broken line shown by "T" in FIG. 5, and is set beforehand in the memory section 24. Thus, in Step S9, this mark is transmitted to the distal station as, for example, one line of picture information. Consequently, a broken-line mark T is recorded on the sheet of the receiving facsimile apparatus, between the information from the preceding original sheet 27 and the information from the succeeding original sheet 27'.

Figure 5:
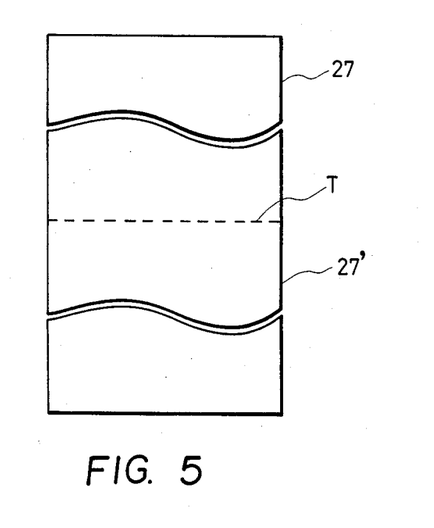
FIG. 5 is an illustration of an example of the pagination pattern.

The operator of the distal station, therefore, can easily recognize the demarcation between the information from the preceding original sheet and the information from the succeeding original sheet by visually observing the mark T appearing on the continuous sheet and, therefore, can use this mark in cutting the continuous sheet correctly for the purpose of, for example, filing. Thus, there is no risk of cutting the continuous sheet at a wrong position, which is often experienced with the conventional facsimile apparatus handling a continuous rolled sheet and having no cutting mechanism. According to the invention, the information carried by a plurality of separate, successive original sheets is regarded and handled as though it were a single batch of information carried by a single original sheet. As a result, the communication time is shortened advantageously because of the elimination of troublesome operation which would otherwise be necessary at the interval between successive original sheets.

In the described embodiment, the fact that the facsimile apparatus of the distal station has no cutting mechanism is confirmed through the protocol used in advance of the commencement of transmission. This, however, is not the only approach contemplated by the inventor. For instance, it is possible to arrange the apparatus such that, if the type of the facsimile apparatus of the distal station is known beforehand, the Step S3 is directly executed by appointment through the operation panel. Such an arrangement is advantageous in that it eliminates any inconvenience caused by the use of the non-standard device signal, i.e., the impossibility of data exchange between two facsimile apparatus of different manufacturers.

As has been described, the present invention offers an advantage owing to the fact that it regards and handles information on separate, successive original sheets as being a batch of information from a continuous original sheet. This, however, imposes a problem in that an impractically long time and labour is required for retransmission in the event of a communication error. To obviate this problem, in a second embodiment of the invention, not all but a group of a predetermined number of original sheets, e.g., three sheets, is regarded and handled as a single sheet, and the facsimile communication process is executed each time the transmission from each group of the original sheets is completed, as will be understood from the following description.

The construction of this second embodiment is materially the same as that of the first embodiment explained in connection with FIGS. 1 and 2, except the controlling operation of the control section 21. The control operation of the control section 21 in the second embodiment will be explained with refernece to a flow chart shown in FIG. 6.

Figure 6:
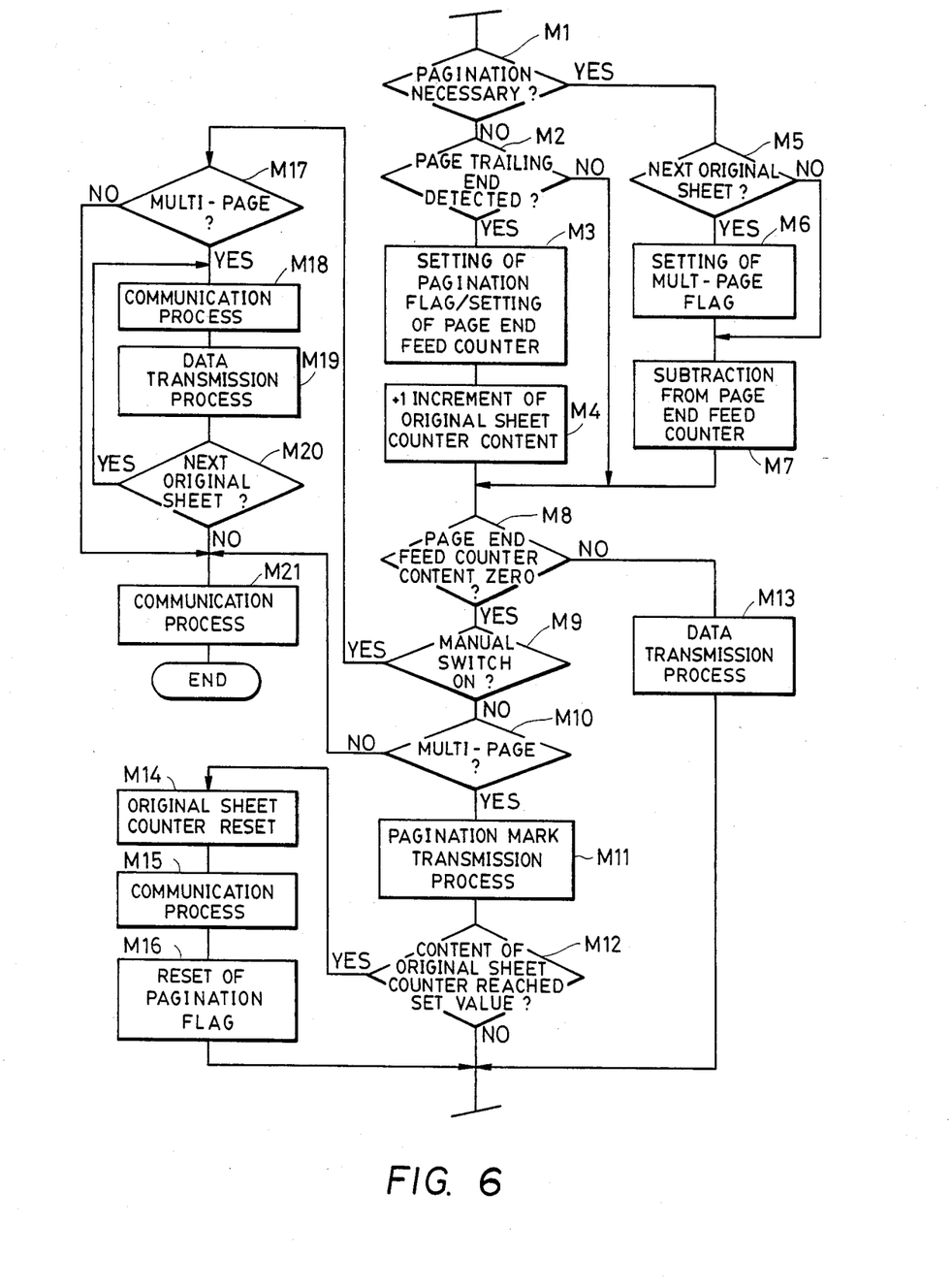
FIG. 6 is a flow chart showing the control process in another embodiment of the invention.

When the reading of the information on the first original sheet 27 is commenced, a judgement is made in Step M1 illustrated in FIG. 6 as to whether the pagination operation is necessary, as is done in Step S1 in the process of the first embodiment. While the information on the first original sheet is being read, the process proceeds to Step M2, in which a judgement is made as to whether the trailing end of the original sheet has been detected by the original sheet detector 25.

If the trailing end has not been detected, the process proceeds directly to Step M8, whereas, if the same has been detected, the process proceeds to Step M8 via Steps M3 and M4. In Step M3, the control section 21 sets a flag which indicates whether the pagination process is to be conducted in Step M1, and sets a predetermined value in a page end feed counter which is provided in a predetermined area of the memory section 24. This value corresponds to the amount of operation of the conveyor roller 26 required for conveying the original sheet from the position of the original sheet detector 25 to the position of the reading section 23.

In Step M4, the control section 21 executes a +1 increment of the content of an original sheet counter which is set in, for example, a preselected area of the memory section 24. As will be explained later, the facsimile communication is conducted each time the original sheet counter counts a predetermined number of sheets, i.e., when the information on a predetermined number of sheets has been transmitted.

In Step M8, a judgement is made as to whether the content of the page end feed counter is zero, as is done in Step S7 shown in FIG. 3. If not zero, the process proceeds to Step M13, and the one-line data read by the reading section 23 is transmitted by the same process as with a conventional facsimile system. After the transmission, the process returns to Step M1, and the above-described operation is repeated.

On the other hand, when the setting of the flag executed in Step M3 is detected in a subsequent execution of Step M1, the process proceeds to Step M5, in order to conduct the pagination operation. In this Step M5, the state of the original sheet detector is examined to judge whether an additional original 27' has been fed in a manner shown in FIG. 4. If there is no succeeding sheet, the process proceeds to Step M7 directly. However, when the presence of a succeeding sheet is confirmed, the process proceeds to Step M7 through Step M6, in which the control section sets the multi-page flag indicative of the presence of a plurality of original sheets.

In Step M7, a subtraction or decrement is effected from the content of the page end feed counter, each time a predetermined amount of operation is performed by the motor for driving the conveyor roller 26. The process then proceeds to Step M8.

In Step M8, a judgement is made as to whether the content of the page end feed counter has been reduced to zero. If the answer is YES, the process proceeds to Step M9. In Step M9, the control section 21 judges whether a manual switch provided in the operation panel 28 has been turned on. If this manual switch has been turned on, the known facsimile communication is conducted upon completion of transmission of the information of each original sheet, instead of treating a plurality of original sheets as being a single continuous sheet as described above. If the "on" state of the manual switch is confirmed in Step M9, the process proceeds to Step M17, whereas, if not, the process proceeds to Step M10.

In Step M10, the control section makes a judgement as to whether there is a succeeding original sheet, on the basis of the multi-page flag which was set in Step M6. If the answer is YES, i.e., if there is an additional original sheet, the process proceeds to Step M11, whereas, if the answer is NO, the process proceeds to Step M21.

In Step M11, a graphic pattern is transmitted as in Step M3 shown in FIG. 3, and the process proceeds to Step M12.

Step M12 is a step in which the content of the original sheet counter has reached a predetermined value, i.e., a predetermined number of sheets (three sheets in the example being illustratively described) have been transmitted. The arrangement may be such that the operator can set in the original sheet counter any desired number of sheets through a key-input switch on the operation panel. If the transmission of the predetermined number of sheets is confirmed in Step M12, the process proceeds to Step M14. However, if the same is not confirmed, the process returns to Step M1.

In Step M14, the control section 21 resets the original sheet counter and the process further proceeds to Step M15.

In Step M15, a judgement as to whether there is any transmission error and confirmation of transmission mode of the picture signal are conducted through the facsimile communication process which is known per se. Thereafter, the process proceeds to Step M16, in which the control section 21 resets the pagination flag which was set in Step M3. Referring back to Step M9, if the "on" state of the manual switch is confirmed, the process proceeds to Step M17 in which, as in the case of Step M6, a judgement is made as to whether there is an additional original sheet. If the answer is NO, i.e., if there is no succeeding sheet, the process proceeds to Step M21. On the other hand, if the answer is YES, i.e., if there is a succeeding sheet, facsimile communication is conducted in the manner known per se, through Steps M18, M19 and M20. In these three steps, in other words, the facsimile communication process is conducted upon completion of data transmission from each of the original sheets.

Finally, in Step M21, the facsimile communication process known per se is conducted to indicate the safe completion of transmission of information from all the original sheets, and the communication line is opened, thus completing the transmission.

In the second embodiment described hereinbefore, the operation mode can be changed to the ordinary facsimile transmission mode any time such a change is required during transmission, simply by turning on the manual switch provided in the operation panel. In addition, since a small number of original sheets, e.g., three, are regarded and handled as being a single continuous sheet, the re-transmission in case of any communication error does not require so much time and labour. The broken-line mark which indicates the demarcation between the information from the preceding original sheet and the information from the succeeding original sheet may be substituted for by other types of mark, such as one-dot-and-dash line, a mark representing a pair of scissors, or other suitable marks.

Although the invention has been described through specific terms, it is to be noted that the described embodiments are only illustrative and various changes and modifications may be imparted thereto without departing from the scope of the invention, which is limited solely by the appended claims.

What is claimed is:

1. A facsimile apparatus comprising:
    reading means for reading information from an original sheet;
    transmission means for transmitting picture information received from said reading means;
    detecting means for detecting the presence of the original sheet at a predetermined position;
    memory means storing predetermined picture information representing a boundary between successive original sheets; and
    control means adapted to cause said transmission means, selectively, (1) to transmit the picture information stored in said memory means in response to either the trailing end of a preceding original sheet or a leading end of a succeeding original sheet being detected by said detecting means during reading and transmission of information from a plurality of successive original sheets, and (2) to transmit information carried by a plurality of successive separate original sheets as a batch of information carried by a single continuous sheet.

2. A facsimile apparatus according to claim 1, further comprising conveyor means for conveying the original sheets along a predetermined path of conveyance to said reading means, said detecting means being disposed at a predetermined position along said path of conveyance.

3. A facsimile apparatus according to claim 2, wherein said control means is adapted to recognize the completion of transmission of information from an original sheet upon receipt of a detection output from said detecting means representing the detection of the trailing end of the original sheet.

4. A facsimile apparatus according to claim 3, wherein said control means is adapted to read the picture information from said memory means and to allow said transmission means to transmit the read picture information upon recognizing the completion of transmission of the information from each original sheet, and, after the completion of transmission of the picture information, to start the transmission of information from a succeeding original sheet.

5. A facsimile apparatus according to claim 3, wherein said control means includes a counter which counts the amount of driving of said conveyor means necessary for conveying the original sheet from the position of said detecting means to the position of said reading means, and recognizes the completion of transmission of information from the original sheet from the content of said counter.

6. A facsimile apparatus according to claim 5, wherein said control means is adapted to set in said counter a predetermined value corresponding to said amount of operation of said conveyor means when the trailing end of an original sheet is detected by said detecting means, and executes a subtraction each time said predetermined amount of operation is performed by said conveyor means, thus recognizing the completion of transmission of information from each of a plurality of successive original sheets.

7. A facsimile apparatus according to claim 1, wherein said control means is adapted to perform such a control that information carried by a predetermined number of separate successive original sheets is transmitted as a batch of information carried by a single continuous original sheet.

8. A facsimile apparatus according to claim 1, further comprising instruction means which gives an instruction to said control means for transmitting information carried by a plurality of separate successive original sheets as a batch of information carried by a single continuous original sheet.

9. A facsimile transmission method comprising:

reading original data;

transmitting the original data read in said reading step;

detecting the presence or absence of the original data;

continuing said transmitting step without an intervening performance of facsimile communication page-end protocol, when the presence of succeeding original data is detected in said original data detecting step;

detecting completion of transmission of information from the original data; and transmitting predetermined boundary picture information, when the presence of succeeding original data is detected in said original data detecting step at the time of completion of transmission of preceding original data.

10. A facsimile transmission method according to claim 9, wherein said reading step is a step for reading information from an original sheet.

11. A facsimile transmission method according to claim 10, wherein said original data detecting step is a step for detecting the presence or absence of the orginal sheet.

12. A facsimile transmission method according to claim 11, wherein said transmission completion detecting step comprises detecting the completion of transmission of information through detecting the position of the trailing end of the original sheet under transmission and recognizing the distance between the trailing end and the position where the information is read.

13. A facsimile transmission method according to claim 12, wherein the recognition of said distance is performed by subtracting the amount of conveyance of the original sheet from the distance between the position where the trailing end is detected and the position where the information is read.

14. A facsimile transmission method according to claim 11, further comprising:

detecting completion of transmission of information from a predetermined number of original sheets; and returning the process to said transmitting step after conducting a known facsimile process responsive to the presence of a succeeding original sheet being detected after detection of completion of transmission of information from the predetermined number of original sheets.

15. A facsimile apparatus comprising:

reading means for reading information from an original sheet;

transmission means for transmitting picture information received from said reading means;

detecting means for detecting the presence of the original sheet at a predetermined position; and control means adapted to cause said transmission means to transmit, responsive to the trailing end of a preceding original sheet or a leading end of a succeeding original sheet being detected by said detecting means during reading and transmission of information from a plurality of successive original sheets, information carried by a plurality of successive separate original sheets as a batch of information carried by a single continuous sheet.

16. A facsimile apparatus according to claim 15, further comprising conveyor means for conveying the original sheets along a predtermined path of conveyance to said reading means.

17. A facsimile apparatus according to claim 16, wherein said detecting means is disposed at a predetermined position along the path of conveyance of said original sheet.

18. A facsimile apparatus according to claim 17, wherein said detecting means detects also the trailing end of the original sheet under transmission.

19. A facsimile apparatus according to claim 18, wherein said control means is adapted to recognize the completion of transmission of information from an original sheet upon receipt of a detection output from said detecting means representing the detection of the trailing end of the original sheet.

20. A facsimile apparatus according to claim 19, further comprising a memory which stores predetermined picture information representing boundary between successive original sheets.

21. A facsimile apparatus according to claim 20, wherein said control means is adapted to read the predetermined picture information from said memory means and to allow said transmission means to transmit the read picture information upon recognizing the completion of transmission of the information from each original sheet, and, after the completion of transmission of the predetermined picture information, to start the transmission of information from a succeeding original sheet.

22. A facsimile apparatus according to claim 20, wherein said control means includes a counter which is for counting the amount of driving of said conveyor means necessary for conveying the original sheet from the position of said detecting means to the position of said reading means, and said control means being adapted to recognize the completion of transmission of information from the original sheet from the content of said counter.

23. A facsimile apparatus according to claim 22, wherein said control means is adapted to set in said counter a predetermined value corresponding to said amount of operation of said conveyor means, responsive to the trailing end of an original sheet being detected by said detecting means, and said control means being adapted to execute a subtraction each time said predetermined amount of operation is performed by said conveyor means, thus recognizing the completion of transmission of information from each of a plurality of successive original sheets.

24. A facsimile apparatus according to claim 15, wherein said control means is adapted to perform such a control that information carried by a predetermined number of separate successive original sheets is transmitted as a batch of information carried by a single continuous original sheet.

25. A facsimile apparatus according to claim 15, further comprising an instruction means which gives an instruction to said control means for transmitting information carried by a plurality of separate successive original sheets as a batch of information carried by a single continuous original sheet.

26. A facsimile apparatus according to either one of claims 1 and 15, wherein said control means is adapted to allow said transmitting means to transmit, when a succeeding original is detected by said detecting means, the information of the succeeding original sheet without conducting an intervening facsimile communication protocol, whereby information carried by a plurality of separate successive original sheets is transmitted as a batch of information on a single continuous original sheet.

27. A facsimile apparatus comprising:
reading means for reading information from an original sheet;
transmission means for transmitting picture information read by said reading means;
detecting means for detecting the presence of an original sheet at a predetermined position; and
control means adapted to cause said transmission means to transmit, responsive to a succeeding original sheet being detected by said detecting means during reading of information from a plurality of successive original sheets, information carried by a plurality of successive separate original sheets as a batch of information carried by a single continuous sheet.

28. A facsimile apparatus according to claim 27, further comprising conveyor means for conveying the original sheets along a predetermined path of conveyance to said reading means.

29. A facsimile apparatus according to claim 28, wherein said detecting means is disposed at a predetermined position along the path of the conveyance of said original sheet.

30. A fascimile apparatus according to claim 27, further comprising an instruction means which gives an instruction to said control means for transmitting information carried by a plurality of separate successive original sheets as a batch of information carried by a single continuous original sheet.

31. A facsimile apparatus according to claim 27, wherein said control means is adapted to allow said transmitting means to transmit, when a succeeding original sheet is detected by said detecting means, the information of the succeeding original sheet without conducting an intervening facsimile communication protocol, whereby information carried by a plurality of separate successive original sheets is transmitted as a batch of information on a single continuous original sheet.

* * * * *